United States Patent [19]

Bynum

[11] Patent Number: 4,505,376
[45] Date of Patent: Mar. 19, 1985

[54] ROCK LOADING APPARATUS

[76] Inventor: Colonel N. Bynum, P.O. Box 455, Choteau, Mont. 59422

[21] Appl. No.: 451,232

[22] Filed: Dec. 21, 1982

[51] Int. Cl.³ .............................................. B65G 65/06
[52] U.S. Cl. .................................... 198/520; 198/735
[58] Field of Search ............... 198/311, 314, 520, 522, 198/308, 728; 414/334, 508; 195/735

[56] References Cited

U.S. PATENT DOCUMENTS

| | | | |
|---|---|---|---|
| 2,230,139 | 1/1941 | Gustin | 198/728 |
| 3,043,030 | 7/1962 | Wisbey | 198/522 |
| 3,306,419 | 2/1967 | Palmer et al. | 198/308 |

Primary Examiner—Joseph E. Valenza
Assistant Examiner—Kyle E. Shane
Attorney, Agent, or Firm—Arthur L. Urban

[57] ABSTRACT

Rock loading apparatus including a frame portion, a rock collecting portion, a rock storing portion and a rock dispensing portion; the frame portion including a wheeled carriage section and an operator's station; the rock collecting portion including a first conveying section, the first conveying section being disposed in an inclined plane, the first conveying section including a first rock supporting surface, the first rock supporting surface including a plurality of spaced openings therein, first continuous drive mechanism disposed along both longitudinal sides of the first conveying section, a plurality of spaced bar members extending between and being attached to the continuous drive mechanism, each of the bar members including a surface disposed in a plane substantially perpendicular to the first rock supporting surface of the first conveying section; the rock storing portion including a hopper section, the hopper section including an upper opening and a lower opening, the upper opening being disposed closely adjacent to the upper end of the rock collecting portion; the rock distributing portion including a second conveying section, the second conveying section including a second rock supporting surface, the second rock supporting surface being disposed closely adjacent to the lower opening of the hopper section, the second conveying section being movable in a direction transversely to the movement of the first conveying section, and second drive mechanism for the second conveying section.

6 Claims, 6 Drawing Figures

ROCK LOADING APPARATUS

This invention relates to a novel loading apparatus and more particularly relates to a new apparatus for loading rocks.

Rocks have been collected for a variety of purposes throughout history. In primitive societies, rocks were gathered to build shelters. Also, rocks were and still are removed from fields in the clearing of land for agriculture and other purposes.

Originally, the collecting of rocks was accomplished by hand. Each rock was lifted by hand and carried to a suitable repository. This method of moving rocks is very slow and requires a great deal of physical effort. Persons collecting rocks by hand had to have a great amount of available time to complete the task. Also, they had to be in excellent physical condition.

However, many people do not have the necessary time or the physical strength to collect rocks by hand. In this situation, an individual must hire someone to do the task in his place. Hiring someone to due such a menial task may be difficult.

Alternatively, the task may be done with machinery. Such machinery ordinarily would include some type of scoop. Loading equipment including a bucket or scoop that is movable commonly is utilized for this purpose.

Although the use of conventional loading equipment eliminates the hand labor, it is not without problems. The scooping of the rocks and the movement of the machinery to transfer the rocks to a desired location still can require considerable time. For example, with a front end loader, the rocks must be scooped off the ground and the scoop full of rocks raised and pivoted to the side where the rocks can be unloaded.

Although this method is less time-consuming and less difficult than hand labor, it still is slow work, particularly if the rocks are in a continuous row rather than a single pile. In that case, the machine must be moved periodically along the row and set up for work at each stop.

Another type of machinery that has been employed to load rocks is conveying equipment. This equipment may include an inclined endless belt. While this machinery may be of assistance in loading rocks into a truck, generally with such equipment it is difficult to pick up the rocks off the ground. Also, the conveying surface may not be durable enough to withstand the severe abrasion of the rocks for any extended period.

From the above discussion, it is clear that none of the methods proposed or used in the past or present provide a satisfactory solution to the problems encountered in collecting and loading rocks.

The present invention provides a novel apparatus for loading rocks. The apparatus of the invention loads rocks simply and efficiently. Rocks can be loaded by a single individual using the apparatus of the invention. With the rock loading apparatus, rocks can be picked up quickly so that a large quantity of rocks can be loaded in a given period of time. The rock loading apparatus is particularly useful for picking up rocks that have been gathered into a continuous row, being preferably self-propelled.

The rock loading apparatus of the invention is simple in design and can be fabricated relatively inexpensively. The apparatus can be manufactured from commercially available materials and components. Conventional equipment manufacturing techniques and procedures can be utilized in its fabrication.

The apparatus of the invention can be used efficiently by farmers, ranch hands and equipment operators after a minimum of instruction. The loading apparatus is durable in construction and has a long useful life. The design of the apparatus minimizes downtime for maintenance.

These and other advantages and benefits of the novel rock loading apparatus of the present invention will be apparent from the following description and the accompanying drawings in which.

Figure 1:
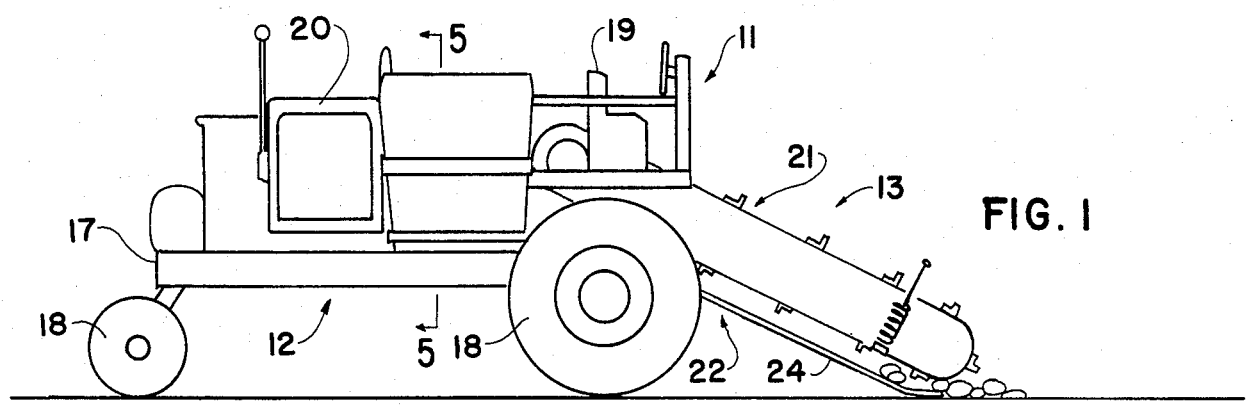
FIG. 1 is a side elevation of one form of the rock loading apparatus of the invention.

As shown in the drawings, one form of the novel rock loading apparatus 11 of the present invention includes a frame portion 12, a rock collecting portion 13, a rock storing portion 14 and a rock dispensing portion 15. The frame portion 12 of the rock loading apparatus 11 includes a carriage section 17 with wheels 18.

Also, the frame section includes an operator's station 19. Advantageously, the operator's station 19 is located adjacent the intersection of the rock collecting portion 13 and the rock dispensing portion 15. The frame portion 12 also preferably includes power source means such as engine 20 for moving the apparatus over a field and for driving the rock collecting portion 13 and the rock distributing portion 15. The driving of the portions 13 and 15 may be through suitable mechanical and hydraulic mechanisms.

The rock collecting portion 13 of the rock loading apparatus 11 of the invention includes a first conveying section 21. The first conveying section 21 is disposed in an inclined plane. The first conveying section 21 includes a first rock supporting surface 22.

The first rock supporting surface 22 includes a plurality of spaced openings therein. The spaced openings preferably are longitudinal openings 23 which are formed by the spacing between a plurality of rod members 24 and 25. The rod members 24 and 25 advantageously are disposed generally longitudinally of the direction of movement of the first conveying section 21.

Figure 2:
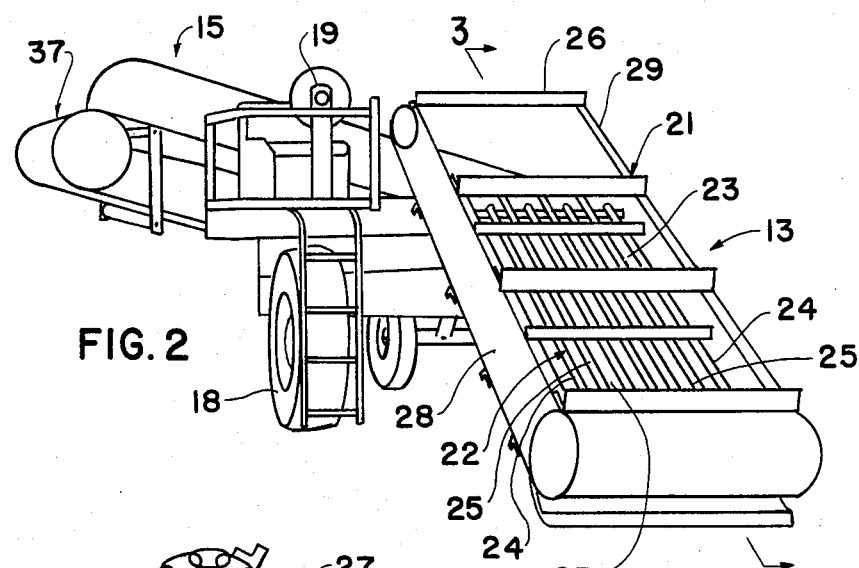
FIG. 2 is a view in perspective of the rock loading apparatus shown in FIG. 1.
Figure 4:
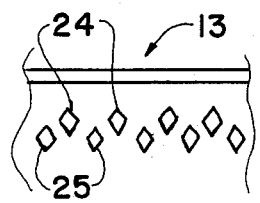
FIG. 4 is a fragmentary sectional view of the rock collecting portion shown in FIG. 3 taken along line 4—4 thereof.
Figure 3:
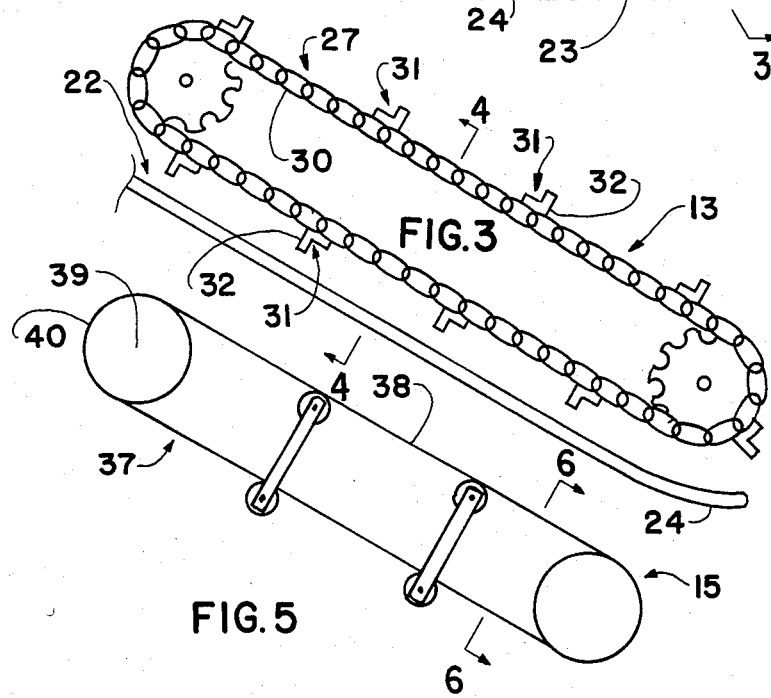
FIG. 3 is a sectional view of the rock collecting portion of the loading apparatus shown in FIG. 2 taken along line 3—3 thereof.
Figure 5:
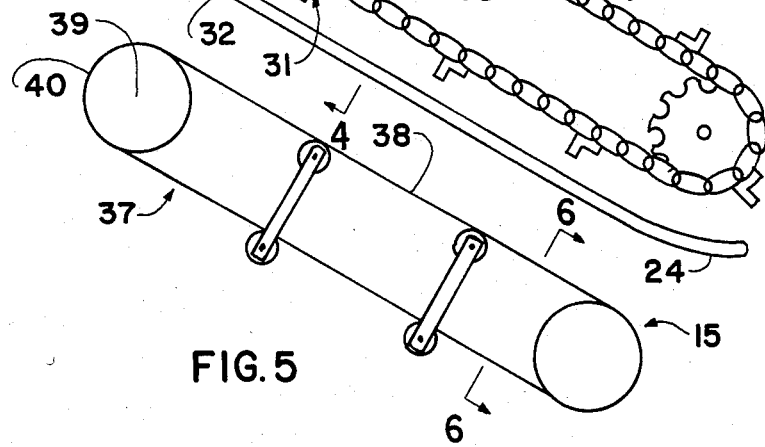
FIG. 5 is a sectional view of the rock loading apparatus shown in FIG. 1 taken along line 5—5 thereof.
Figure 6:
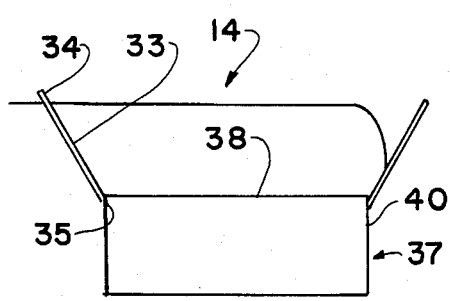
FIG. 6 is a fragmentary sectional view of the rock loading apparatus taken along line 6—6 of FIG. 5.

The spacing between rod members 24 and 25 preferably is greater at the upper or discharge end 26 of the first conveying section 21 than at the lower end thereof. This configuration may be achieved as shown in FIGS. 2 and 4 by offsetting the upper ends of the rod members 24 and 25 in an alternating arrangement.

Thus, the alternate rod members 24 are raised with respect to the other alternating rods 25. This arrangement creates a continuously diverging relationship between the adjacent rod members 24 and 25 from the lower end of the first conveying section 21 to the upper end thereof. The rod members may be disposed in the same plane but be tapered along their length to provide the desired increase in spacing.

The rock collecting portion 13 also includes first continuous drive means 27 disposed along both longitudinal sides 28 and 29 of the first conveying section 21. Advantageously, the continuous drive means 27 includes endless chains 30 as shown in the drawings.

A plurality of spaced bar members 31 extend between the drive means 27 and are attached thereto. Each of the bar members 31 includes a surface 32 disposed in a plane substantially perpendicular to the first rock supporting surface 22 of the first conveying section 21. The bar members 31 preferably have a right angle cross section. The bar members 31 advantageously are disposed in a rock contacting position when they are located along the lower length of the first conveying section 21.

The rock storing portion 14 of the loading apparatus 11 includes a hopper section 33. The hopper section 33 includes an upper opening 34 and a lower opening 35. The upper opening 34 is disposed closely adjacent to the upper end of the rock collecting portion 13.

The rock dispensing portion 15 of the loading apparatus 11 includes a second conveying section 37. The second conveying section 37 preferably includes an endless belt 40. The second conveying section 37 includes a second rock supporting surface 38. The rock supporting surface 38 is disposed closely adjacent to the lower hopper opening 35.

The second conveying section 37 is movable in a direction transversely to the direction of movement of the first conveying section 21. The rock distributing portion 15 also includes second drive means 39 for the second conveying section 37. The second conveying section 37 advantageously is disposed substantially perpendicular to the direction of movement of the first conveying section 21.

The rock loading apparatus 11 of the present invention may be fabricated from commercially available materials and components normally employed in farm equipment. Conventional manufacturing techniques and procedures employed for farm machinery may be utilized in the fabrication of the loading apparatus of the invention.

In the use of the rock loading apparatus 11 shown in the drawings, the apparatus is driven by an operator sitting at station 19 to a location having rocks in a pile or row. The loading apparatus is positioned so the lower end of the rock collecting portion 13 is adjacent to the rocks.

Engine 20 activates drive means 27 and chains 30. The movement of chains 30 causes bar members 31 affixed thereto to advance in an endless pattern. When the bar members 31 are located along the lower length of the chains, the bars are in a rock contacting position, that is, the bars 31 move against rocks and push them upwardly along the first rock supporting surface 22 including rod members 24 and 25.

As the rocks, entrained dirt and other debris are moved upwardly along the rods 24 and 25, the smaller debris and rocks first drop between the rods. Since the spacing between the rods increases as the rocks move upwardly in the rock collecting portion 13, increasingly larger debris drops between the rods, leaving only the larger rocks supported on the rods.

The rocks being pushed upwardly by the bars 31 that are too large to drop between the rods 24 and 25 finally reach the upper end 26 of the rock collecting portion 13. From this point, they are pushed into hopper section 33. The rocks are collected in the hopper section until it is substantially full at which time second conveying section 37 is activated. The collected rocks are removed from the hopper section and advance along the second conveying section to the discharge end thereof.

The rocks are delivered from the second conveying section 37 and drop therefrom into a suitable receptacle such as a truck (not shown). A truck may be driven into position under the second conveying section 37 as needed and then driven away when loaded to deposit the rocks at another site.

The loading apparatus 11 can be moved forward slowly to pick up rocks in its path. The rocks are stored in hopper section 33 until it is desired to transfer them to a remote location.

The above description and the accompanying drawings show that the present invention provides a novel apparatus for loading rocks. Rocks can be collected and loaded by one operator quickly and automatically using the apparatus of the invention. A single individual can collect and load a given quantity of rocks in a shorter period of time compared with previous methods of rock removal. The apparatus of the invention enables a person to achieve a high degree of productivity and efficiency.

The rock loading apparatus of the present invention is suitable for use by semi-skilled labor after only a minimum of instruction. The apparatus has a long useful life. It is durable in construction and downtime for maintenance is minimized.

It will be apparent that various modifications can be made in the particular rock loading apparatus described in detail above and shown in the drawings within the scope of the invention. The size, configuration and arrangement of components can be changed to meet specific requirements. These and other changes can be made provided the functioning and operation of the apparatus are not adversely affected. Therefore, the scope of the invention is to be limited only by the following claims.

What is claimed is:

1. Rock loading apparatus including a frame portion, a rock collecting portion, a rock storing portion and a rock dispensing portion; said frame portion including a wheeled carriage section and an operator's station, said operator's station being located adjacent the intersection of said rock collecting portion and said rock dispensing portion to monitor continuously the movement of rocks through said apparatus; said rock collecting portion including a first conveying section, said first conveying section being disposed in an inclined plane, said first conveying section including a first rock supporting surface, said first rock supporting surface including a plurality of spaced rod members disposed generally longitudinally of the direction of movement of said first conveying section, said rod members being disposed in the same plane at the lower end of said first conveying section and at the upper end thereof alternate rod members being offset in separate planes to divert rocks moving upwardly therealong into a plurality of separate channels, first continuous drive means disposed along both longitudinal sides of said first conveying section, a plurality of spaced bar members extending between and being attached to said continuous drive means, each of said bar members including a surface disposed in a plane substantially perpendicular to said first rock supporting surface of said first conveying section, said bar members being in a rock contacting position when disposed along the lower length of said first conveying section; said rock storing portion including a hopper section, said hopper section including an upper opening and a lower opening, said upper opening being disposed closely adjacent to the upper end of said rock collecting portion; said rock dispensing portion including a second conveying section, said second conveying section including a second rock supporting surface, said second rock supporting surface being disposed closely adjacent to said lower opening of said hopper section, said second conveying section being movable in a direction transversely to the movement of said first conveying section and second drive means for said second conveying section; whereby said rock loading apparatus is movable to a collection of rocks, said rocks are moved upwardly along said first conveying section, discharged into said rock storing portion and periodically transferred from said storing portion and along said second conveying section.

2. Rock loading apparatus according to claim 1 wherein said first continuous drive means of said first conveying section includes endless chains.

3. Rock loading apparatus according to claim 1 wherein said bar members of said first conveying section have a right angle cross section.

4. Rock loading apparatus according to claim 1 wherein said second conveying section is disposed substantially perpendicular to the direction of movement of said first conveying section.

5. Rock loading apparatus according to claim 1 wherein said second conveying section includes an endless belt.

6. Rock loading apparatus according to claim 1 wherein said frame portion includes power source means for moving said apparatus and driving said rock collecting portion and said rock distributing portion.

* * * * *